United States Patent [19]

Carter

[11] 3,861,544
[45] Jan. 21, 1975

[54] BELOW GROUND LIFTING APPARATUS

[76] Inventor: Marvin V. Carter, Rte. 1, Troy, Ala. 36081

[22] Filed: Apr. 13, 1973

[21] Appl. No.: 350,840

[52] U.S. Cl. .................. 214/394, 254/136, 254/189
[51] Int. Cl. ........................ B66d 3/08, A61g 19/00
[58] Field of Search .................... 214/392, 394, 396; 254/189, 136

[56] References Cited
UNITED STATES PATENTS

| 451,127 | 4/1891 | Lager | 254/189 |
|---|---|---|---|
| 2,240,564 | 6/1941 | Tourneau | 214/394 |
| 2,444,690 | 7/1948 | Almendinger et al. | 214/394 |
| 2,772,010 | 11/1956 | Buehring | 214/394 |
| 3,348,712 | 10/1967 | Hanson | 214/396 |
| 3,688,931 | 9/1972 | Tax | 214/394 |

Primary Examiner—Albert J. Makay
Attorney, Agent, or Firm—Marcus L. Bates

[57] ABSTRACT

Below ground lifting apparatus for use in combination with a straddle type cart comprised of a main frame member having movable and fixed sheave members connected thereto. Spaced cables are rove about the sheaves and can be connected to a load so that a small amount of movement of the movable member imparts a large amount of movement into each of the cables. The straddle type cart can be moved into overhanging relationship with respect to the load, the cables attached to the load, and the load lifted up into the downwardly opening cart by the action of the movable sheave member.

4 Claims, 14 Drawing Figures

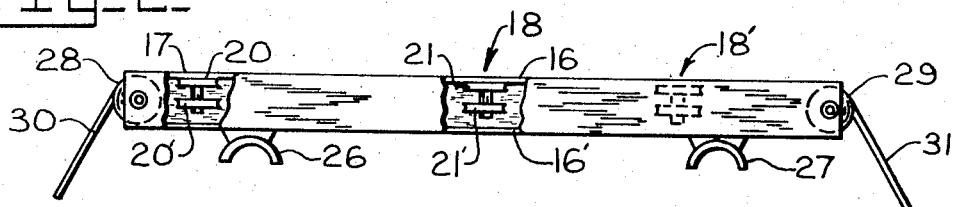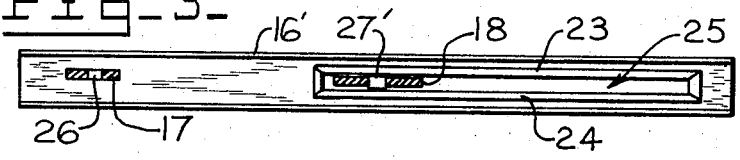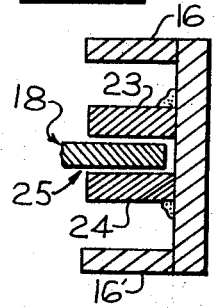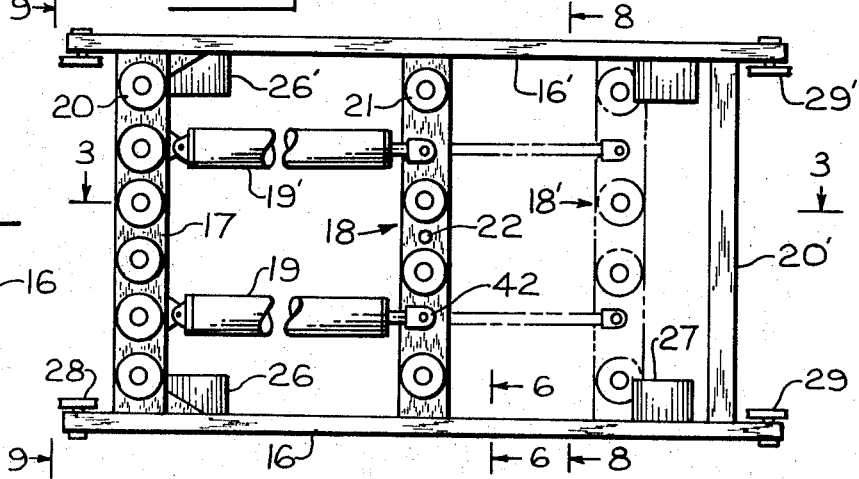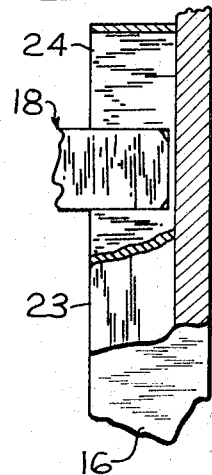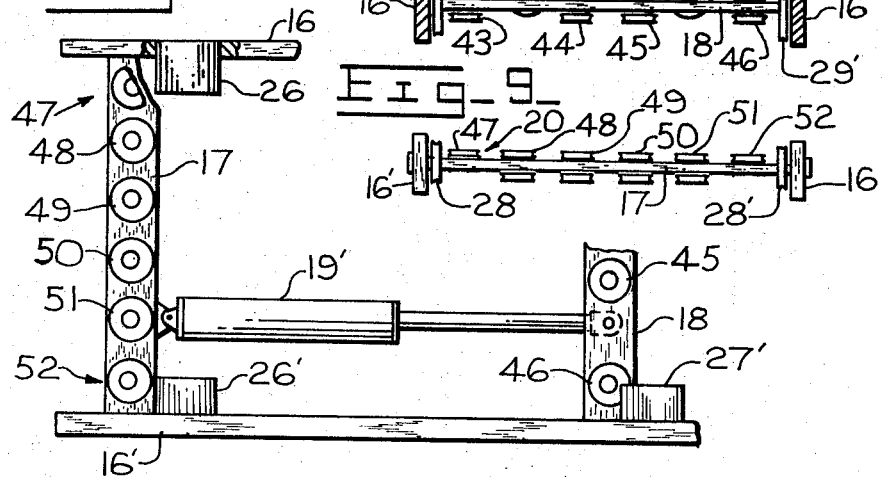

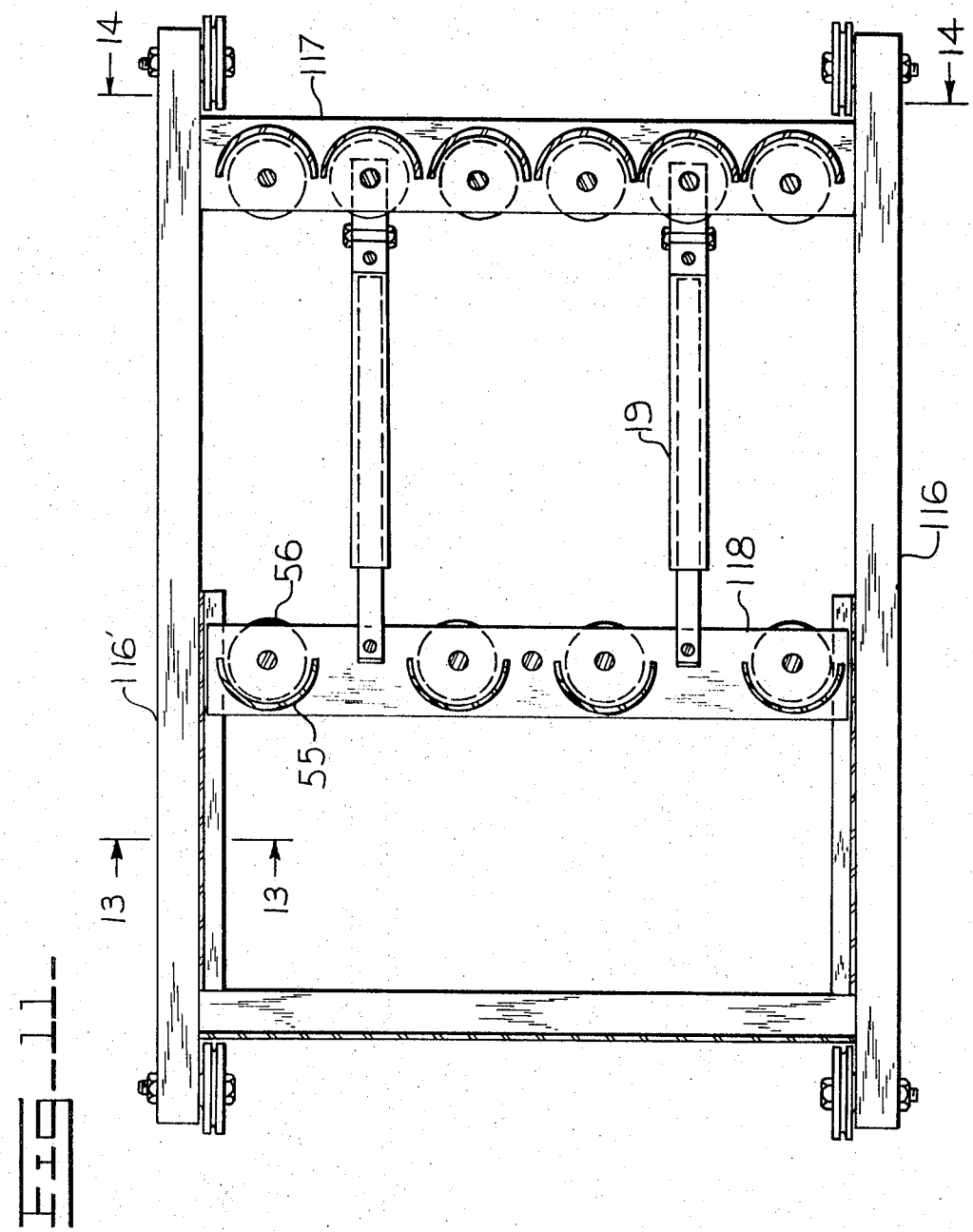

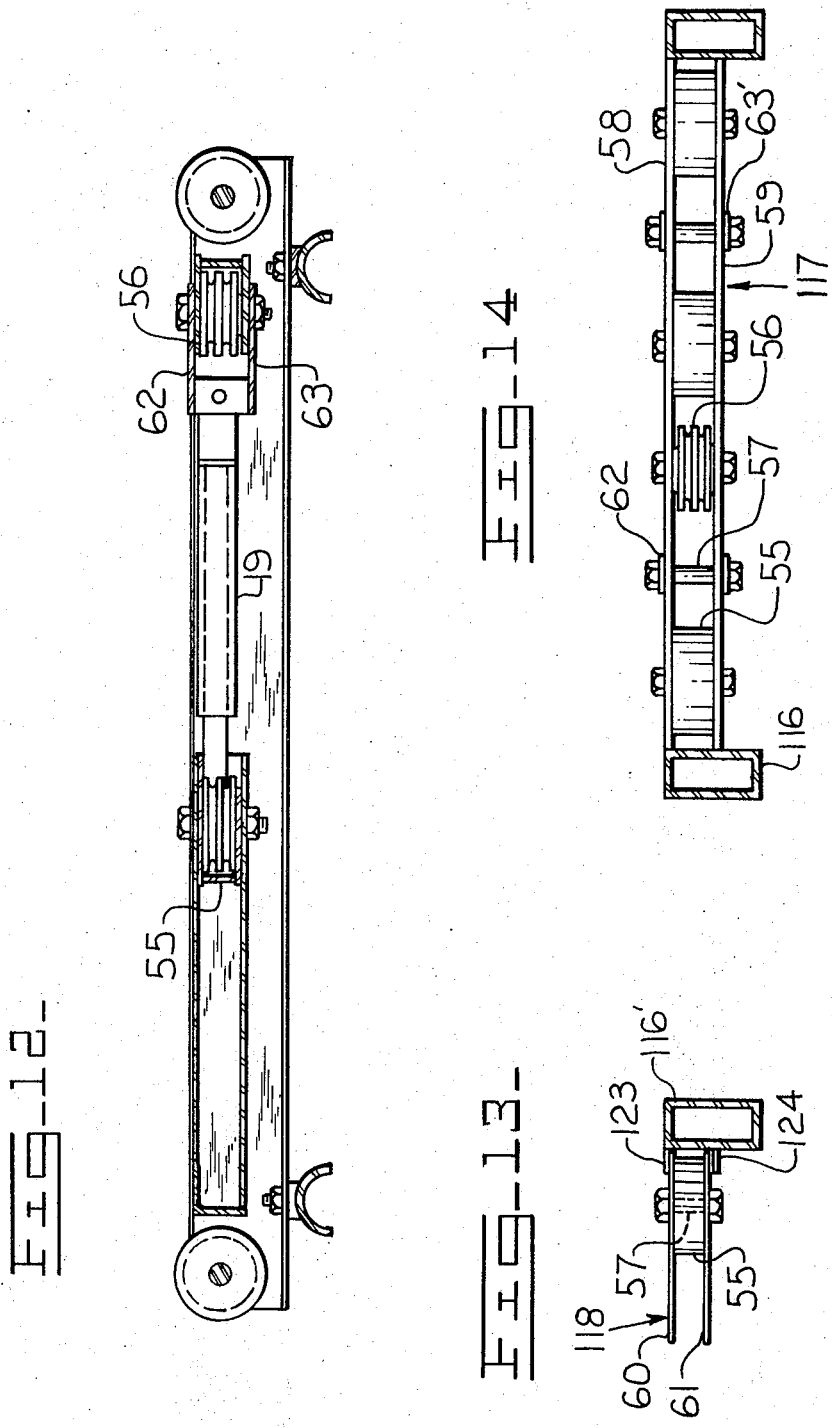

BELOW GROUND LIFTING APPARATUS

BACKGROUND OF THE INVENTION

Straddle type carts or vehicles are known to those skilled in the art and take on many different forms. The carts of the prior art are driven into position over the load which is to be lifted and moved, whereupon the load is moved upwardly into the downwardly opening cart and affixed thereto so that the cart can be transported to another location carrying the load therewith.

In my prior U.S. Pat. No. 3,688,932, a straddle type cart is set forth which can be lowered into proximity of the ground in order to facilitate the lifting of and attachment of a load to the cart. However, when it is desired to raise or lower below ground loads such as fuel tanks and the like, it has heretofore been necessary to employ chain hoists or other auxiliary lifting devices in order to thereby move the load upwardly or downwardly into proper relationship respective of the cart so as to enable the load to be attached thereto or disengaged therefrom.

Accordingly, it is desirable to have made available a below ground lifting apparatus in combination with the above described cart so that placement into and extraction from locations below ground level can be carried out in a logical, rapid, economical and safe manner.

SUMMARY OF THE INVENTION

This invention relates to a below ground lifting apparatus and specifically to a combination straddle type cart and lifting apparatus. The combination is comprised of a main frame member located at the upper extremity of the cart and having depending therefrom a plurality of cables which can be extended from the main frame member of the cart, attached to a load located below the surface of the ground, whereupon the cables will lift the load up into the cart load carrying structures and in underlying relationship relative to the lifting apparatus. The lifting frame member of the lifting apparatus comprises spaced elongate longitudinally extending frame members affixed to one another by a fixed sheave holder. A movable sheave holder is slidably received by the spaced frame members and is actuated towards and away from the fixed sheave holder. A plurality of sheaves located on the fixed and movable sheave holder receives the before mentioned cables therein so that when the fixed and movable sheave holders are moved relative to one another, the free length of the cable is lengthened or shortened in proportion to the amount of movement of the sheave holders and the mechanical advantage employed therein.

Accordingly, a primary object of the present invention is the provision of below ground lifting apparatus for use in conjunction with straddle type carts.

Another object of the invention is to provide a combination below ground lifting apparatus having cables extending downwardly therefrom for engagement with a load located below the surface of the ground, and means for controlling the length of the cables.

A further object of this invention is to provide a below ground lifting apparatus having cables rove through sheaves and to a load to be placed below the ground with the sheaves being arranged so that movement of one set of sheaves relative to another produces a proportional amount of movement into the cable.

These and various other objects and advantages of the invention will become readily apparent to those skilled in the art upon reading the following detailed description and claims and by referring to the accompanying drawings.

The above objects are attained in accordance with the present invention by the provision of a combination of elements which are fabricated in a manner substantially as described in the above abstract and summary.

BRIEF DESCRIPTION OF THE DRAWINGS

FIG. 2 is a side elevational view of below ground lifting apparatus made in accordance with the present invention, with some parts being broken away therefrom in order to better disclose the interior thereof;

FIG. 3 is a cross-sectional view taken along line 3—3 of FIG. 4;

FIG. 4 is a top plan view of apparatus disclosed in the foregoing figures;

FIG. 5 is a broken bottom view of the apparatus disclosed in FIG. 4;

FIG. 6 is an enlarged cross-sectional view taken along line 6—6 of FIG. 4;

FIG. 7 is a broken top plan view of FIG. 6;

FIG. 8 is a cross-sectional view taken along line 8—8 of FIG. 4;

FIG. 9 is an end view looking in the direction indicated by the arrows 9—9 of FIG. 4.

FIG. 11 is a part cross-sectional top view of another embodiment of the invention;

FIG. 12 is a longitudinal, cross-sectional, side view of the apparatus disclosed in FIG. 11;

FIG. 13 is a fragmentary, part cross-sectional view taken along line 13—13 of FIG. 11; and FIG. 14 is a part cross-sectional view taken along line 14—14 of FIG. 11

DETAILED DESCRIPTION OF THE PREFERRED EMBODIMENTS

Figure 1:
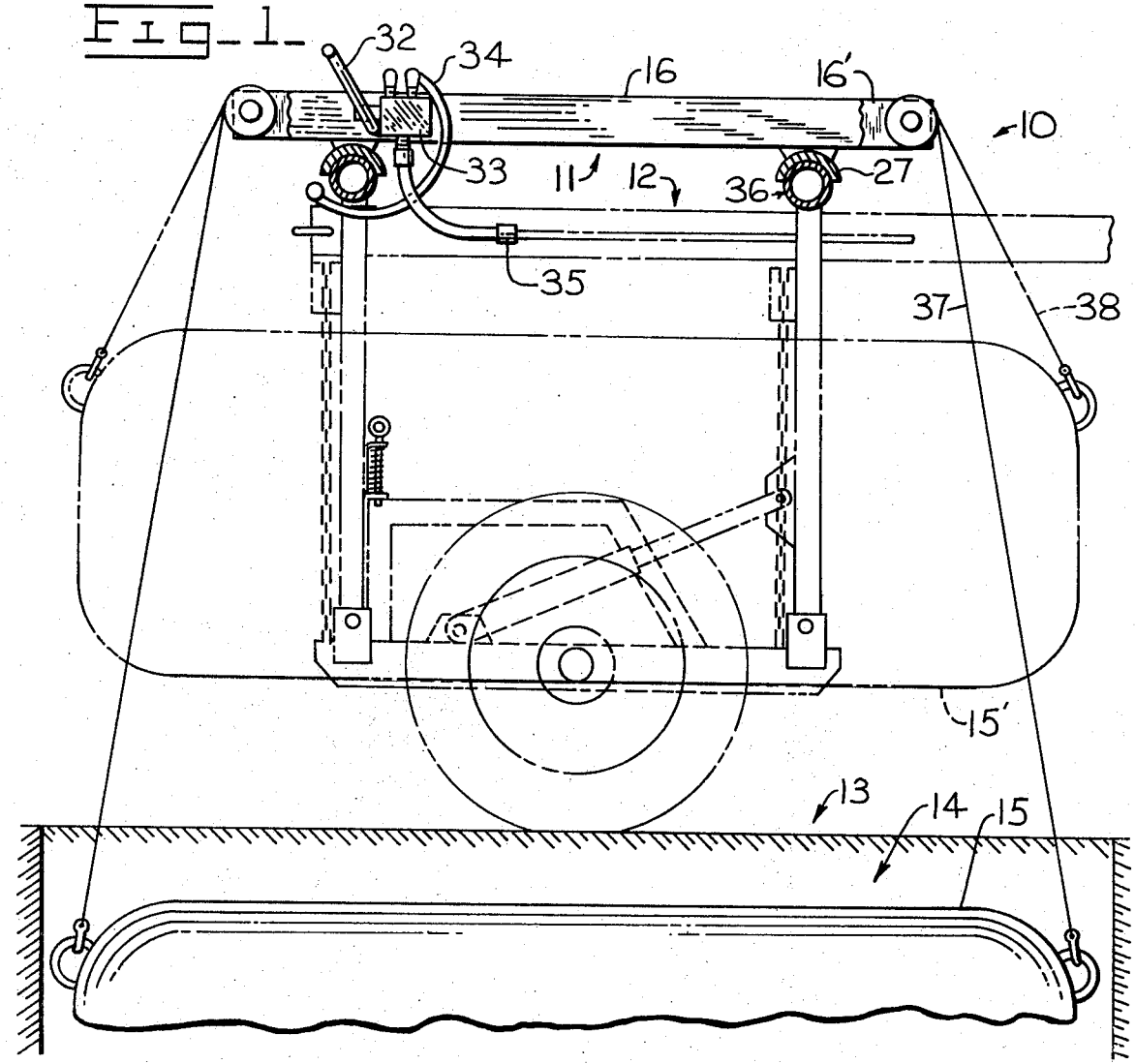
FIG. 1 is a broken part cross-sectional, part diagrammatical side elevational view of a combination straddle type cart and below ground lifting apparatus made in accordance with the present invention, with some additional parts being included therein so as to better disclose the present invention.
Figure 10:
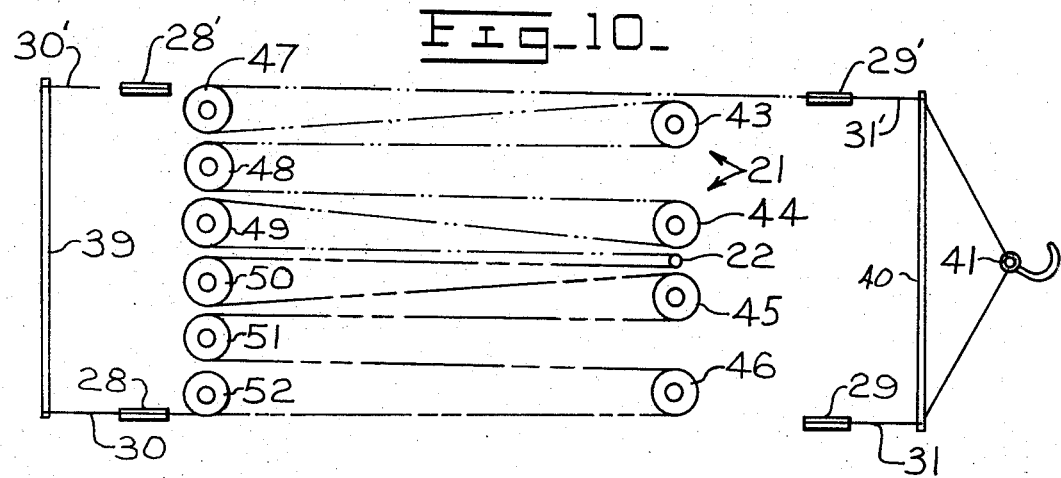
FIG. 10 is a part schematical, part diagrammatical illustration of one operative embodiment of the invention.

In FIG. 1, together with the remaining figures of the drawings, there is disclosed by the arrow at numeral 10 a combination below ground lifting apparatus and straddle type cart. The lifting apparatus 11 is removably affixed to a straddle type cart 12. The cart is bottom supported by the illustrated wheels by the surface of the ground 13, within which a cavity 14 has been formed so that a fuel tank 15 can be transported into the illustrated position 15' respective of the cart. The main frame work is comprised of spaced elongate longitudinally extending frame members 16, 16' which are held in spaced relationship by a laterally disposed fixed sheave holder 17 having the illustrated opposed ends affixed to the before mentioned frame members.

A movable sheave holder 18 is laterally disposed respective to the spaced frame members and is disposed parallel to the fixed sheave holder. Spaced hydraulic actuated cylinders 19, 19' have the piston thereof attached to the movable sheave holder while the piston is journaled to the fixed sheave holder so as to provide means for moving the movable sheave holder longitudinally of the spaced frame members and relative to the fixed sheave holder. A plurality of sheaves 20 are rotatably mounted in journaled relationship to the fixed sheave holder, while a second plurality of sheaves 21 are seen to be journaled to the movable sheave holder. Anchor means 22 which can take on any number of different forms is provided on the movable sheave holder at 22.

Guide means are formed along the marginal longitudinal length of the facing walls of the spaced frame members by the provision of spaced rails 23, 24 of limited length which form a slot 25 within which the marginal opposed ends of the movable sheave holder can be slidably received in low friction relationship therewith. Stop means are seen to be located at each extremity of the cavity so as to prevent the movable member from inadvertently being released therefrom.

Spaced saddles 26, 26', 27, 27' underlie the spaced frame member and provide means by which the lifting apparatus can be removably affixed to existing structure of the saddle type cart as amply illustrated in FIG. 1. Any conventional means of attachment, as for example chains and dogs, can be utilized for attachment thereto.

Spaced guide means 28, 28', 29, 29' are located adjacent to one end portion of each of the spaced frame members for receiving one of the four cables 30, 30', 31, 31' thereon.

Looking now again to FIG. 1, control valve handle 32 controls the flow of hydraulic fluid through the valve 33 and to the hydraulically actuated cylinders by means of the closed loop circuit formed by conduits 34, 35.

Cross members 36 bottom support the main frame member by means of the before mentioned saddle members. Downwardly depending cables, one of which is seen at 37, is rove about the spaced pulleys and can be moved into position 38 as will be more fully explained later on.

The movable member preferably includes four double sets of sheaves at 43, 44, 45, 46. The sheaves can be arranged in the illustrated manner of FIG. 8, or they may be comprised of adjacent sheaves set on the same side of the movable member, as for example a double grooved sheave. The sheaves attached to the fixed member are comprised of sheaves 47, 48, 49, 50, 51 and 52. Single sheaves are provided at 47 and 52 while double sheaves are provided at 48–51. Alternatively, double grooved sheaves may be arranged at 48 to 51 in lieu of the spaced double sheave arrangement seen in the illustration of FIG. 9.

While four cables 30, 30' and 31, 31' are illustrated in the preferred embodiment, it should be understood that only two cable lengths having a mid portion thereof tied to anchor 22 could be used herein and such an expedient would fall within the comprehension of the term "four cables."

Stated differently, four cable ends 30, 30', 31, 31' are necessary to practice the preferred embodiment of the invention, regardless of how the four cable lengths are obtained. For this matter, rope, wire, and other rope or wire-like material, including chains, can be employed in practicing the invention and such an expedient would fall within the comprehension of this disclosure.

Cable 30 is rove about pulley 28 and then about one of the double sheaves located at 46, 51, 45, 50; and anchored at 22. The cable 30' is similarly rove about a pulley 28' and then about the corresponding remaining sheaves located at 43, 48, 44, 49 and to the anchor. Cable 31' is received by pulley 29' and rove about one of the sheaves located at 47, 43, 48, 44, 49 with the end of the cable being anchored at 22. The cable 31 is received by the pulley and then rove about the sheaves located at 29, 52, 46, 51, 45, 50 and anchored at 22. The free movable ends of cables 30, 30' are tied to stabilizer bar 39 which in turn is provided with a yoke or the like in the indicated manner of FIG. 1. The free movable cable ends 31, 31' are tied to stabilizer bar 40 which in turn is affixed to the illustrated hook member 41 by a similar yoke arrangement, or in any convenient manner so as to enable the load to be lifted by the bar.

In the embodiment of FIGS. 11–14, the fixed sheave holder 117 has the opposed ends thereof affixed to the spaced longitudinal frame members 116, 116'. The movable sheave holder 118 is laterally disposed respective to the spaced longitudinal frame members, and is disposed parallel to the fixed sheave holder. The illustrated hydraulic cylinders and pistons are attached to the movable and fixed sheave holders in a manner to produce relative movement therebetween as set forth in the before described manner.

The movable sheave holder 118 is comprised of spaced superimposed lateral members 60 and 61 which are joined together by the illustrated curved or semicircular cable guards 55, with the guards being welded to the members 60 and 61. The sheaves are received within the cavity or area defined by the guard in conjunction with the spaced members 60, 61, with the illustrated bolt 57 forming a journal for the sheave.

The marginal outer end portions of the movable sheave holder is slidably received in low friction relationship between the illustrated guide means which is illustrated herein as being in the form of spaced rails 23 and 24. It will be noted that a pair of rails are affixed to an inside surface of each of the longitudinally extending frame members by welding as in the before described manner of the first preferred embodiment.

The fixed sheave holder is comprised of upper and lower superimposed spaced members 58 and 59, with the members being joined together by the before mentioned cable guides 55, the sheave receiving bolts 57, and two longitudinally extending frame members.

Spaced plates 62 and 63 are affixed to the fixed plate members by utilizing the sheave bolt in the illustrated manner of FIGS. 12 and 14. In FIG. 14, it will be noted that two of the cable guides have been removed so as to better illustrate the invention. The arrangement of the cables with respect to the various sheaves and pulleys is identical to the embodiment disclosed in FIGS. 1–10.

In operation, the lifting apparatus is affixed to an upper extremity of the cart of FIG. 1, the control valve handle 32 is placed into the lifting position after the hooks have been attached to the load to be lifted, whereupon, hydraulic pressure from the cart hydraulic system is connected to cause cylinders 19 to telescope the piston, thereby causing member 18 to move into the dot-dashed position 18' of FIG. 4. This action causes the four spaced cables to be pulled or retracted into the main frame member, thereby lifting the load up into the cart, where the load can be securely fastened to the cart structure, if desired. When it is desired to lower a load from the cart, the above procedure is reversed.

The sheaves at 47 and 52 are single grooved members while the remaining sheaves may be two spaced members as seen at 21 and 19, for example, or alternatively may be a double grooved member, as seen at 56 in FIG. 14.

I claim:

1. In combination with a straddle type cart having an overhead structure, a below ground lifting apparatus affixed to the overhead structure of the cart, said below ground lifting apparatus comprising a main frame member made of spaced elongate frame members, said frame members having opposed facing walls, a fixed sheave holder having opposed ends affixed to said spaced frame members, a first plurality of sheaves, means rotatably mounting said sheaves in journaled relationship to said fixed sheave holder;

guide means formed along a marginal longitudinal length of the opposed facing walls of said spaced frame members;

a movable sheave holder having opposed ends slidably received in low friction relationship by said guide means; a second plurality of sheaves, means rotatably mounting said second plurality of sheaves in journaled relationship to said movable sheave holder;

means for moving said movable sheave holder longitudinally of said spaced frame members and relative to said fixed sheave holder;

a first, second, third, and fourth cable means, each said cable means having one end anchored to said lifting apparatus and the remaining end thereof depending away from said lifting apparatus for engagement with a load to be lifted; said first cable means having a marginal length thereof rove in series relationship about a group of said first and second plurality of sheaves so that when said movable member is moved a small distance, the remaining end of said first cable means is moved a proportional longer distance; said second, third, and fourth cable means, respectively, each having a marginal length thereof rove in series relationship about a second, third and fourth group, respectively, of said first and second plurality of sheaves, so that said second, third, and fourth cable means will be moved by the action of said movable member in a manner similar to the action of said first cable means;

spaced cable guide means each being located adjacent to one end portion of one of said spaced frame members;

each of the recited cable means being received by one of said cable guide means so that the cable means are each depending downwardly away from said lifting apparatus in spaced relationship to one another.

2. The lifting apparatus of claim 1 wherein the four cable means are each anchored to said movable member.

3. The lifting apparatus of claim 1 wherein said means for moving said movable sheave holder is a hydraulically actuated cylinder and piston assembly, means attaching said cylinder to one of said sheave holders and means attaching said piston to the remaining one of said sheave holders; and means for causing said piston to telescope into and out of said cylinder to thereby cause relative movement between said sheave holders.

4. The lifting apparatus of claim 1 and further including means by which said lifting apparatus is removably affixed to said straddle cart.

* * * * *